United States Patent [19]

Pringle

[11] Patent Number: 4,791,668

[45] Date of Patent: Dec. 13, 1988

[54] SELECTABLE IMPEDANCE LINE INTERFACE CIRCUIT

[75] Inventor: Bruce G. Pringle, Nepean, Canada

[73] Assignee: Northern Telecom Limited, Montreal, Canada

[21] Appl. No.: 100,052

[22] Filed: Sep. 23, 1987

[51] Int. Cl.[4] .............................................. H04B 3/36
[52] U.S. Cl. ..................................... 379/398; 379/400
[58] Field of Search .................................. 379/402–404, 379/398–400, 338, 340, 345; 370/32.1

[56] References Cited

U.S. PATENT DOCUMENTS

| | | | |
|---|---|---|---|
| 2,864,901 | 12/1958 | Aigrain et al. | 379/402 |
| 3,919,502 | 11/1975 | Daryanani | 379/403 |
| 4,027,114 | 5/1977 | Kahlbrock | 379/402 X |
| 4,096,361 | 6/1978 | Crawford | 379/403 |
| 4,682,355 | 7/1987 | Bailly | 379/398 X |

FOREIGN PATENT DOCUMENTS 1261898  2/1968  Fed. Rep. of Germany ...... 379/400

*Primary Examiner*—Eugene R. LaRoche
*Assistant Examiner*—Benny Lee
*Attorney, Agent, or Firm*—J. E. Moorhouse

[57] ABSTRACT

An interface circuit a.c. couples a transmission line and a port of a telecommunications facility. The transmission line may be of any of n characteristic impedances. The interface circuit includes a resistor network having at least 2n+1 resistor elements. The resistor network is connected to ground by at least one of the resistor elements. A switching device includes at least n switching elements being connected between n of the resistor elements and an input of an amplifier. A transformer includes first, second and third windings, the first winding being for connection to the transmission line, the second winding being connected between an output of the amplifier and a junction between the one of the resistor elements and at least another of the resistor elements, and the third winding being connected between ground and a point in the resistance network other than the junction. A resistor connects at least one of the n switching elements and the port of the telecommunication facility. A control device is connected to the switching device for controlling each of said switching elements to be of one of a high resistance state and a lower resistance state. In one example, each of the switching elements consists of a semiconductor which includes at least one field effect transistor.

5 Claims, 2 Drawing Sheets

SELECTABLE IMPEDANCE LINE INTERFACE CIRCUIT

The invention is concerned with electronic transmission and reception of signals via a transmission line and more particularly pertains to interface circuits which are adaptable to provide more than one terminating or source impedance.

BACKGROUND OF THE INVENTION

A typical transmission line is of a single preferred characteristic impedance. Any impedance discontinuity anywhere along the line or at either of its terminating ends causes an undesirable reduction or attenuation of signals being transmitted along the line from one end to another. Therefore it is common practice to connect the transmission line between line interface circuits which are designed to provide source and terminating impedances which will compensate for the frequency characteristics of the transmission line.

For example, in the telecommunication industry, a so called E&M trunk includes a pair of wires used for transmitting analog signals, another pair of wires for receiving analog signals, and yet another pair of wires for trunk supervision signals. The usual characteristic impedance of the transmitting and receiving pairs of wires in North America is 600 ohms. However other termination impedances, for example 1200 ohms and 150 ohms are in standard common usage to provide frequency compensation.

The change in terminating impedance to correct for cable frequency response produces a change in the flat loss through the cable. The circuit must therefore change the impedance and provide an accompanying gain change to maintain the same signal level with the improved frequency response.

A line interface circuit may be adaptable to more than one characteristic impedance by providing metallic contact switches for selecting any one of a plurality of terminating resistances. In one example, selection by manual switches may be effected, at any time, to select one of a plurality of operating impedances for the line interface circuit. However, the potential for erroneous selection and the added expense of manual switches are significant disadvantages.

The error potential may be significantly reduced by substituting relay switches for manual switches, whereby the selected impedance of each line interface circuit is effected at a central location, for example, a central control area in a telecommunications facility. However, an added expense is associated with providing appropriate relays and relay driver circuits. A further expense to be born by the operating company is the subsequent and on-going additional floor space and operating power requirement of the relays.

SUMMARY OF THE INVENTION

It is an object of the invention to provide a line interface circuit wherein a predetermined source or a terminating a.c. impedance value is selectable by means of semiconductor switch elements, in spite of potentially wide variances of MAKE resistance value in such semiconductor switch elements.

An interface circuit adaptable for providing a preferred a.c. terminating impedance for a transmission line is comprised of an inverting amplifier having an input and an output; first and second resistors R1 and R2 being connected to the amplifier input; and a transformer including a first winding for connection to the transmission line, a second winding connected between the amplifier output and a junction of the second resistor and a third resistor R3, and a third winding being connected in series between the third resistor and the first resistor, remote from the second resistor. The preferred a.c. terminating impedance is determined by selection of appropriate values for the resistors R1, R2 and R3.

An interface circuit, in accordance with the invention, provides for a.c. coupling a transmission line, of any one of n predetermined characteristic impedances, and a port of a telecommunication facility. The interface circuit includes a resistance network, having at least $2n+1$ resistor elements, each being of a predetermined ohmic value. The resistance network is connected to ground by a one of said resistor elements. A switching device includes at least n switching elements being connected between n of the resistor elements and an input of an amplifier. A transformer includes first, second and third windings, the first winding being for connection to the transmission line, the second winding being connected between an output of the amplifier and a junction between the one of the resistor elements and at least one other of the resistor elements, and the third winding being connected between ground and a point in the resistance network other than the junction. A resistance is connected to at least one of the n switching elements and provides a signal path between a port of the telecommunication facility and the line interface circuit. A control means is connected to the switching device for controlling each of the switching elements to be of one of a high resistance state and a lower resistance state.

In one example, each of the switching elements consists of a semiconductor being at least one field effect transistor.

BRIEF DESCRIPTION OF THE DRAWINGS

An example embodiment is discussed in the following with reference to the accompanying drawings in which.

DESCRIPTION OF THE EXAMPLE EMBODIMENT

Figure 1:
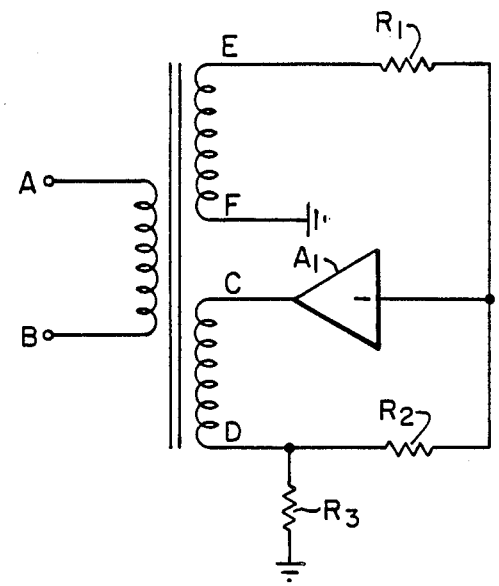
FIGS. 1 and 2 are schematic diagrams which serve to illustrate impedance matching principles used in the invention.

The circuit illustrated in FIG. 1 operates to define an impedance across a first transformer winding at terminals A and B. The impedance is derived via an inverting amplifier A1, from a combination of voltage from a resistor R1 and voltage developed by current feedback through resistors R2 and R3. Current in the first winding at A and B induces current in a second winding C, D, which flows from an output of the amplifier A1 to ground via the resistor R3. The resulting voltage across the resistor R3 is proportional to the instant current in the winding connected between the terminals A and B and is combined via the resistor R2 with voltage induced across a third transformer winding E, F, via the resistor R1. In this arrangement, the third transformer winding E, F operates in a substantially unloaded condition such that the voltage induced across it is about proportional to the voltage across the first winding at the terminals A and B. The impedance across the first winding at A and B is proportional to the current through the winding and the voltage across the winding. The impedance is determined by a ratio of selected ohmic values of the resistors R1 and R2. Actual resistance values of the second and third windings are relatively unimportant because of the gain of the amplifier A1.

Figure 2:
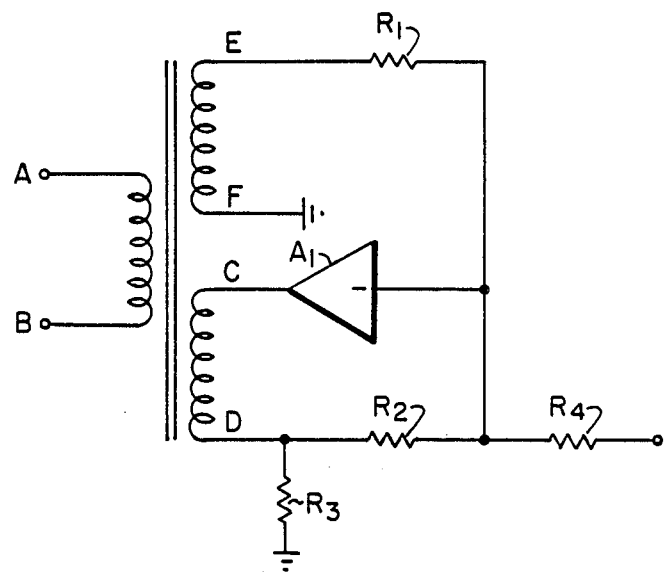

The circuit in FIG. 2 is the same as the circuit in FIG. 1, except for the addition of a resistor R4 which serves to couple analog signals for transmission via the terminals A and B. The output of the amplifier A1 in the illustrated configuration varies to maintin an a.c. ground at the input of the amolifier A1. Hence the addition of the resistor R4 is of no significant effect on the circuit impedance. Once the values of R1 and R2 are set, value of the resistor R4 determines the amount by which the analog signal is amplified by the amplifier A1.

Figure 3:
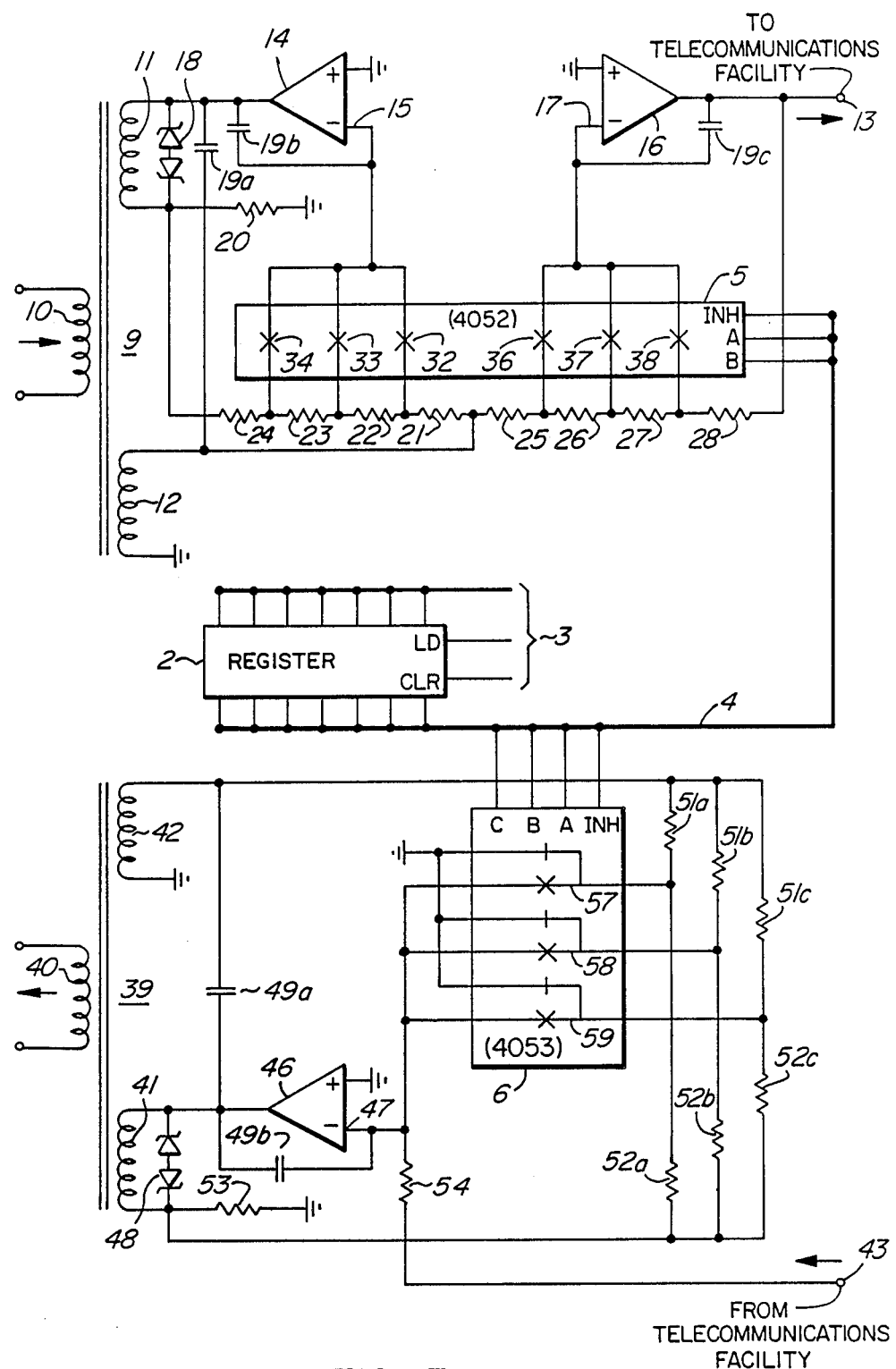
FIG. 3 is a schematic diagram of a telecommunication line interface circuit for transmitting and receiving analog signals via a four wire transmission line of one of three possible different characteristic impedances, in accordance with the invention.

The line interface circuit in FIG. 3 is based on the principles discussed with relation to FIGS. 1 and 2. A receive portion of the line interface circuit is illustrated in an upper part of FIG. 3, and a transmit portion is illustrated in a lower part of FIG. 3. Any one of three matching impedances is selected via a control bus 4 connected to switching devices 5 and 6. The switching devices 5 and 6 are controllable from a central location via data and control leads at 3, connected to a digital register 2. Examples of economically acceptable switching devices for use in the line interface circuit are available from Motorola Corp., of 1303 East Algonquin Road, Roselle, Ill., 60196, U.S.A., and are described on pages 6-132 to 6-138 of their current catalogue. The devices 5 and 6 are identified by Motorola product numbers 4052 and 4053 respectively, and are generally described as analog multiplexers/demultiplexers.

In the receiver portion of the line interface circuit a transformer 9 includes a first transformer winding 10 for connection to a transmission line, a second transformer winding 11 connected in series between an output of a differential amplifier 14 and ground via a resistor 20, and a third transformer winding connected between ground and a resistor 21 at one end of a series resistance network 21-24 24. The resistor 24 is at another end of the resistance network and is connected to a junction of the resistor 20 and the second transformer winding 11. A resistor 25 at one end of another series resistance network 25-28 is connected at a junction of the third transformer winding 12 and the resistor 21. The resistor 28 at another end of the series resistance network is connected at a junction of an output terminal 13 and an output of a differential amplifier 16. The amplifiers 14 and 16 each include inverting inputs 15 and 17 respectively. In this example, a pair of zener diodes 18 is connected across the second transformer winding 11 and are intended to provide some protection against transient overvoltages as may be induced by lightening strikes or the like on the transmission line. Capacitors 19a, 19b and 19c are connected as shown to prevent oscillations, and each is of about 10 picofarads capacitance.

The switching device 5 includes field effect transistors being arranged in groups such that the functional equivalents of MAKE contacts labeled 32-38 are achieved. As may be realized and with reference to the previously mentioned catalogue, the closed contact or ON resistance of any one of these MAKE contacts is at best predictable within a few hundreds of ohms. However, in the illustrated circuit arrangement, this variance of ON resistance is of insignificant consequence providing that only one of the MAKE contacts 32-34 and only a corresponding one of the MAKE contacts labeled 36-38 is selected to be ON at any one time. Selection of the ON MAKE contacts is effected via the binary inputs A and B of the switching device 5.

In operation, the MAKE contacts 34-32 select the one of three available resistance ratios to define one of three predetermined terminating impedances. Likewise, the MAKE contacts 36-38 select a corresponding one of three available resistance ratios whereby a desired amount of amplification of signals having been received by the third transformer winding is provided via the amplifier 16 which . couples the received signals to the telecommunication facility.

The transmitting portion of the line interface circuit includes a transformer 39 having a first transformer winding 40 for connection to a transmission line. A second transformer winding 41 is connected between an output of a differential amplifier 46 and ground via a resistor 53. A third transformer winding 42 is connected between ground and a junction of resistors 51a, 51b and 51c in a series/parallel resistance network. A junction of resistors 52a, 52b and 52c also in the series/parallel resistance network is connected to a junction of the resistor 53 and the second transformer winding 41. An input terminal 43, for receiving analog signals is connected to an inverting input 47 of the differential amplifier 46 via a resistor 54. A pair of zener diodes 48 is connected in series across the second transformer winding 41 with the intention of providing protection against transient overvoltages as may be induced, via the transmission line, due to lighting strikes or the like. Capacitors 49a and 49b are connected as shown to prevent oscillation and may be of capacitance values of about 10 picofarads.

The switching device 6 includes field effect transistors being arranged in groups such that the functional equivalent of transfer contacts labeled 57, 58 and 59 is achieved. Of course, as the device 6 is provided by the same semiconductor technology as the device 5, the ON resistance of each of the contact elements is not accurately predictable. However, in the illustrated circuit arrangement, variance of ON resistance is of insignificant consequence providing that only one MAKE portion of the three transfer contacts 57-59 is ON at any one time. Selection of one ON MAKE portion of one of the transfer contacts and two ON 5 BREAK portions of the remaining two transfer contacts is effected via binary inputs A, B and C of the switching device Suitable transformers 9 and 39 for four wire E and M trunk termination may be constructed on a Siemens ferrite core type H5C2 or equivalent. One distributor of Siemens cores is Permog of 2960 South Avenue, Toledo, Ohio, U.S.A., 43609. The first, second and third windings consist of 580 turns, 580 turns and 170.5 turns of #32 AWG copper wire, respectively. Examples of resistor values to provide 150, 600 and 1200 ohms of terminating impedance are as follows:

| Resistor | Value in Ohms |
| --- | --- |
| 20 | 121 |
| 21 | 33.2K |
| 22 | 64.9K |
| 23 | 28.0K |

-continued

| Resistor | Value in Ohms |
| --- | --- |
| 24 | 45.3K |
| 25 | 51K |
| 26 | 30K |
| 27 | 18K |
| 28 | 100K |
| 51a | 88.7K |
| 51b | 61.9K |
| 51c | 30.1K |
| 52a | 30.1K |
| 52b | 39.2K |
| 52c | 100K |
| 53 | 121 |
| 54 | 61.9K |

Although the example embodiment has been described in terms of separate elements 2, 5, 6, 14, 16 and 46, it will be apparent to persons of typical skill in the semiconductor electronic art that for volume production it may be advantageous to implement the circuit in a more integrated circuit form.

What is claimed is:

1. An interface circuit for a.c. coupling a transmission line, of any one of n predetermined characteristic impedances, to a port (43) of a telecommunications facility, said port being of a predetermined and fixed impedance, the interface circuit comprising:
   a resistance network including at least 2n+1 resistor elements (51a, 51b, 51c, 52a, 52b, 53c, 53), each being of a predetermined ohmic value, n resistor elements (52a, 52b, 52c) of the resistance network being connected to ground by a one of said resistor element (53);
   an amplifier (46) having an input (47) and an output;
   a switching device (6) including n switching elements (57, 58 and 59) being connected between 2n of the resistor elements and the input of the amplifier;
   a transformer (39) having a first winding (40) for connection to the transmission line, a second winding (41) being connected between the output of the amplifier and a first junction between said one of the resistor elements and at least one other of the resistor elements, and a third winding (42) being connected between ground and a second junction of n resistor elements (51a, 51b, 51c) of the resistance network;
   means (54) for coupling signals between any one of the said n switching elements and the port of the telecommunication facility; and
   a control means (2) being connected to the switching device for controlling each of said switching elements to be of one of a high resistance state and a lower resistance state.

2. An interface circuit as defined in claim 1 wherein each of the switching elements includes a functional MAKE contact portion and a functional BREAK contact portion in a semiconductor structure and each switching element is controllable to provide a TRANSFER contact function.

3. An interface circuit for a.c. coupling a transmission line, of any one of n predetermined characteristic impedances, to a port (13) of a telecommunications facility, said port being of a predetermined and fixed impedance, the interface circuit comprising:
   a series resistance network including at least 2n+3 resistor elements (20-28), each being of a predetermined ohmic value, the resistance network being connected to ground by a one of said resistor elements (20);
   first and second amplifiers (14, 16) each having an input and an output;
   a switching device including 2n switching elements, n of the switching elements (32-34) being connected between n of the resistor elements and the input of the first amplifier and n of the switching elements (36-38) being connected between another n of the resistor elements and the input of the second amplifier, whereby signals are coupled to said port;
   a transformer (9) having a first winding (10) for connection to the transmission line, a second winding (11) being connected between the output of the first amplifier and a junction between said one (20) of the resistor elements and at least one other of the resistor elements, and a third winding (12) being connected between ground and a point in the resistance network other than said junction;
   means for coupling signals between at least one of the said n switching elements and the port of the telecommunication facility; and
   a control means (2) being connected to the switching device for controlling each of said switching elements to be of one of a high resistance state and a lower resistance state.

4. An interface circuit as defined in claim 3, wherein a switching device is a semiconductor structure.

5. An interface circuit for a.c. coupling a four wire transmission line of any one of n predetermined characteristic impedances with corresponding input and output ports of a telecommunication facility, the interface circuit comprising:
   first, second third amplifiers (46, 14, 16), each having an output and an inverting input;
   a first resistance network (51a, 51b, 51c, 52a, 52b, 52c, 54) including 2n+1 resistors, and a second resistance network (20-28) including 2n+3 resistors being connected in series between ground and output ports;
   a first transformer (39) including a first winding (40) for connection to a pair of the transmission line wires, a second winding (41) being connected between the output of the first amplifier and ground via a first resistor in the first resistance network, and a third winding (42) being connected between a junction of n resistors (51a, 51b, 51c) in the first resistor network and ground;
   a first switching device (6) including n transfer switches (57-59), each including a BREAK portion connected to ground, a MAKE portion connected to the inverting input of the first amplifier, and a MAKE BREAK junction between said portions, each MAKE BREAK junction being connected to corresponding ones of the n resistors;
   n resistors (52a, 52b, 52c) in the first resistor network being connected at a junction of the first resistor and the second winding;
   a second transformer (9) including a first winding (10) for connection to another pair of the transmission line wires, a second winding (11) being connected between the output of the second amplifier and ground via a first resistor in the second resistance network, and a third winding (12) being connected to a junction in the second resistance network and round, said junction being n+1 resistors removed from the first resistor;

a second switching device including first and second groups of n MAKE portions, the first group of n MAKE portions being connected between the inverting input of the second amplifier and respective n junctions of the n+1 resistors, and the second group of n MAKE portions being connected between the inverting input of the third amplifier and respective n junctions of a remaining n+1 resistors of the second resistance network; and register means being connected to each of the switching devices for controlling states of the respective MAKE and BREAK portions such that any one of n operating interface circuit impedances is selectable.

* * * * *